UNITED STATES PATENT OFFICE.

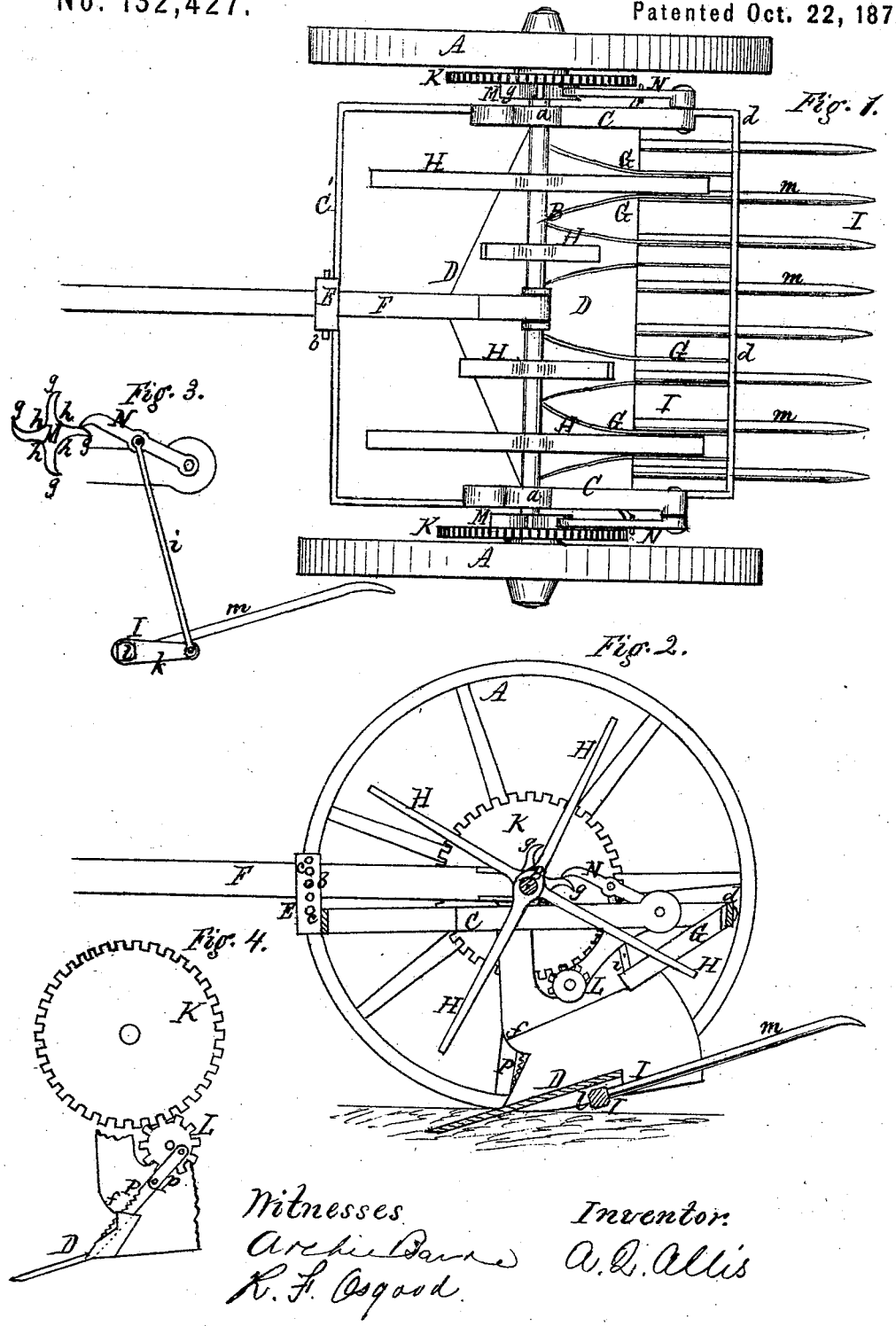

ABRAM Q. ALLIS, OF ROCHESTER, NEW YORK.

IMPROVEMENT IN POTATO-DIGGERS.

Specification forming part of Letters Patent No. 132,427, dated October 22, 1872.

*To all whom it may concern:*

Be it known that I, ABRAM Q. ALLIS, of the city of Rochester, in the county of Monroe and State of New York, have invented certain Improvements in Potato-Diggers, of which the following is a specification:

This invention consists in the construction and arrangement of the machine, as hereinafter described.

In the drawing, Figure 1 is a plan; Fig. 2, a sectional elevation; and Figs. 3 and 4, detail views.

A A represent the driving-wheels, and B the axle. C C' is the main frame, which is hung by bearings $a$ $a$ upon the axle, so as to turn free thereon to adjust the mold-board D to cut deeper or shallower as circumstances may require. At the front the frame has a clevis or loop, E, which embraces the tongue F, and is adjusted higher or lower thereon by means of a pin, $b$, and a series of holes, $c$ $c$. By this means the adjustment of the frame is secured, as before described. At the rear the frame has a cross-bar, $d$, armed with a series of scrapers, G G, which are made up in pairs, located at such a distance apart as will allow the rotating arms H H to pass between, as shown in Figs. 1 and 2. The extremities of the scrapers are preferably turned outward to allow a free entrance of the arms. The arms H are attached to the axle and revolve with it, and are each independent of the others, and they are so arranged in a spiral line that their ends sweep, in succession one after another, over the surface of the mold board or share D, thereby bearing back the dirt that comes thereon in separate sweeps to the shaker I.

An advantage is secured by making these arms separate from each other and following successively over the mold-board, as thereby the dirt will be moved back gradually from end to end in small bodies, and will not become clogged as when a reel or other device is used, which acts bodily from end to end, as in that case the whole mass must move at once, which is impracticable with the power ordinarily attained in potato-diggers. The scrapers G G are also of importance in this connection to clear the arms of potato-tops, roots, and dirt, which they do by embracing the arms and sweeping off the extraneous matter.

On each side a cog-wheel, K, is made fast to the axle, which gives motion to a pinion, L, attached concentrically to the side pieces $f$. These gears keep in engagement at whatever angle the main frame is set. To each cog-wheel, or to the axle at each end, is attached an eccentric or cam, M, which consists of arms $g$ $g$ made convex or rounding at the ends, Fig. 3, and with the intermediate surfaces $h$ $h$, rounded out in regular form, or made concave, as clearly shown in Fig. 3. On each eccentric rests the end of a pawl, N, pivoted at the rear to the frame. A connecting-rod, $i$, connects this pawl with a crank-arm, $k$, of the shaker I. This shaker consists of a shaft, $l$, and a series of tines, $m$ $m$, as shown. As the mass is thrown back from the mold-board to the shaker, the latter vibrates up and down by the action of the pawls upon the eccentrics, and the potatoes are thoroughly shaken out.

I am aware that shakers of a somewhat similar form and for a similar purpose are in use; but mine differs from them in the employment of the peculiar-shaped eccentrics, whereby a sudden concussion or jar is produced by the fall of the pawls from one arm of the eccentric to another. This jar causes a perfect separation to be made, which cannot be accomplished where the shaker is operated by a crank or similar device, which does not allow the sudden fall but only a gradual one as the crank turns.

Another advantage of this peculiar form of the eccentric is that the intermediate concaves $h$ allow a back play of the pawls therein in backing up the machine and before the detents in the hubs of the wheels will release. Were it not for this the machine would become locked and breakage would occur. In these particulars of the eccentrics and pawls my invention is new as far as I am aware.

The vertical sides or shanks $f$ $f$ of the mold-board have reciprocating saws P P, which play up and down in slots or sockets of said sides, leaving the serrated edges open and standing forward, as shown in Fig. 4. These saws receive motion by means of crank-arms $p$ $p$ pivoted to pinions L. Instead of this form circular saws may be used for the same purpose. The object of these saws is to cut the vines between the rows and prevent clogging, which would otherwise ensue.

What I claim, and desire to secure by Letters Patent, is—

1. The frame C, made in the form of a square or rectangle with cross-bars C' d, both in front and rear, and hung in bearings a a upon the axle, the front cross-bar having the clevis E resting on and embracing the tongue, and the rear cross-bar having the scrapers G G for cleaning the spiral arms H H, as and for the purpose set forth.

2. In a potato-digger, I claim the arms H H arranged spirally, and each acting independently and successively, in combination with the mold-board D and scrapers G G, substantially as described.

In witness whereof I have hereunto signed my name in the presence of two subscribing witnesses.

A. Q. ALLIS.

Witnesses:
H. R. STOCKBRIDGE,
H. H. WARNER.